(12) United States Patent
Ebel et al.

(10) Patent No.: US 12,176,146 B2
(45) Date of Patent: Dec. 24, 2024

(54) POWER MODULE WITH AN INTEGRATED ALUMINIUM SNUBBER CAPACITOR

(71) Applicants: Syddansk Universitet, Odense M (DK); Fraunhofer-Gesellschaft zur Förderung der angewandten Forschung e.V., Munich (DE)

(72) Inventors: Thomas Ebel, Mildstedt (DE); Andreas Schletz, Amberg (DE)

(73) Assignees: Syddansk Universitet, Odense (DK); Fraunhofer-Gesellschaft zur Förderung der Angewandten Forschung E. V., Munich (DE)

( * ) Notice: Subject to any disclaimer, the term of this patent is extended or adjusted under 35 U.S.C. 154(b) by 221 days.

(21) Appl. No.: 17/758,097

(22) PCT Filed: Jan. 27, 2021

(86) PCT No.: PCT/EP2021/051871
§ 371 (c)(1),
(2) Date: Jun. 28, 2022

(87) PCT Pub. No.: WO2021/151952
PCT Pub. Date: Aug. 5, 2021

(65) Prior Publication Data
US 2023/0032223 A1 Feb. 2, 2023

(30) Foreign Application Priority Data
Jan. 31, 2020 (EP) .................................... 20154920

(51) Int. Cl.
*G06F 1/16* (2006.01)
*H01G 2/06* (2006.01)
(Continued)

(52) U.S. Cl.
CPC ............. *H01G 2/06* (2013.01); *H01G 9/0003* (2013.01); *H01G 9/035* (2013.01); *H01G 9/045* (2013.01); *H01G 9/28* (2013.01)

(58) Field of Classification Search
CPC ........ H01G 2/06; H01G 9/0003; H01G 9/035; H01G 9/045; H01G 9/28
See application file for complete search history.

(56) References Cited

U.S. PATENT DOCUMENTS 6,142,130 A 11/2000 Ward
6,327,165 B1 12/2001 Yamane et al.
(Continued)

FOREIGN PATENT DOCUMENTS

CN 106783180 A 5/2017
DE 112018000701 T5 10/2019
(Continued)

OTHER PUBLICATIONS

Panasonic Technical Guide—Aluminum Electrolytic Capacitors.
(Continued)

*Primary Examiner* — Anthony M Haughton
(74) *Attorney, Agent, or Firm* — Knobbe Martens Olson & Bear LLP

(57) ABSTRACT

This invention concerns a power module comprising a power device, a baseplate, circuit carrier, and a flat stacked aluminium electrolytic snubber capacitor comprising a layered structure of a cathode layer, a separator layer, comprising paper and an electrolyte and an anode layer, comprising an aluminium material with an aluminium oxide dielectric, wherein the circuit carrier are mounted on the baseplate, the power device and snubber capacitor are placed on the circuit carrier within the power module and electrically connected (Continued)

to the circuit carrier, the circuit carrier being configured for providing an electrical connection between the power device and the snubber capacitor.

15 Claims, 6 Drawing Sheets

(51) Int. Cl.
  *H01G 9/00*    (2006.01)
  *H01G 9/035*   (2006.01)
  *H01G 9/045*   (2006.01)
  *H01G 9/28*    (2006.01)
  *H05K 5/00*    (2006.01)
  *H05K 7/00*    (2006.01)

(56) References Cited

U.S. PATENT DOCUMENTS

| | | | |
|---|---|---|---|
| 2012/0020025 A1* | 1/2012 | Sotome | H01G 4/228 |
| | | | 361/704 |
| 2013/0146339 A1 | 6/2013 | Yano et al. | |
| 2013/0277800 A1* | 10/2013 | Hori | H01L 28/40 |
| | | | 257/532 |
| 2019/0371530 A1* | 12/2019 | Hemphill | H01G 9/0032 |

FOREIGN PATENT DOCUMENTS

| | | | |
|---|---|---|---|
| EP | 2264728 A1 | 12/2010 | |
| WO | WO-2015064409 A1 * | 5/2015 | ........ B60L 11/1803 |
| WO | WO 2018/194153 A1 | 10/2018 | |

OTHER PUBLICATIONS

International Preliminary Report on Patentability for PCT/EP2021/051871 dated Jan. 18, 2022.
International Search Report for PCT/EP2021/051871 dated Apr. 14, 2021.

* cited by examiner

POWER MODULE WITH AN INTEGRATED ALUMINIUM SNUBBER CAPACITOR

CROSS REFERENCE TO RELATED APPLICATIONS

This application is a U.S. National Phase Application of PCT International Application Number PCT/EP2021/051871, filed on Jan. 27, 2021, designating the United States of America and published in the English language, which is an International Application of and claims the benefit of priority to European Patent Application No. 20154920.1, filed on Jan. 31, 2020. The disclosures of the above-referenced applications are hereby expressly incorporated by reference in their entireties.

FIELD OF THE INVENTION

The present invention relates to a power module with an integrated aluminium electrolytic snubber capacitor.

BACKGROUND OF THE INVENTION

Power modules are used in many different applications. The general use of a power module is for the control and conversion of electrical power. One example of a power module is an IGBT (insulated gate bipolar transistor) module, which may be used to invert power from DC to AC. During power conversion voltage spikes or voltage transient are generated. These spikes need to be suppressed in order for the output voltage to be used, as these spikes may damage equipment and applications being powered by the power module or they would need a high robustness margin.

In order to damp the voltage spikes, a snubber capacitor is commonly used in the circuit. The choice of the snubber capacitor is chosen according to the operating conditions of the power module, but generally, the capacitor is required to be able to withstand high peak currents, high voltage stresses and high temperatures. Currently, ceramic and film capacitors are used as snubber capacitors, since they can withstand these high temperature and stresses. However, the thermal resistance to the heat sink of these capacitors is not ideal, as they are difficult to sufficiently cool under operation, and therefore cannot be integrated within the power module itself. The snubber capacitor needs to have high capacitance in high voltage power modules, which again points mostly to ceramic and film capacitors.

However, ceramic capacitors are expensive. Integrating the capacitors into the power module requires deep knowledge about the capacitor itself in order to do a robust design due to thermo-mechanical behaviours. Ceramic capacitors further do not have self-healing capacities. Short circuit is the end of life failure mode, which is not accepted in most applications. To fulfil the robustness requirements, ceramic capacitors are often connected in series to have the possibility of redundancies of single capacitors. Further, ceramics capacitors sometimes causes ringing and voltages peaks due to their low parasitic series resistance, which may heavily depend on temperature, frequency and voltage. These properties are undesired.

Polymer film capacitors do not have a high energy density, which makes them very big in volume and hard to integrate. The polymer materials have a very poor thermal conductivity. Therefore, the parasitic resistance cannot be used to generate a high amount of power losses. For snubber applications, the ohmic resistance has to be an additional device. The metallization of film capacitors have to be very thin and the film's temperature low enough to provide self-clearing capability of the capacitor.

Hence, an improved and simpler power module would be advantageous, and in particular, a snubber capacitor, which can be integrated into a power module, would be advantageous.

OBJECT OF THE INVENTION

It is a further object of the present invention to provide an alternative to the prior art.

In particular, it may be seen as an object of the present invention to provide a power module that solves the above mentioned problems of the prior art with power module snubber capacitors.

SUMMARY OF THE INVENTION

Thus, the above described object and several other objects are intended to be obtained in a first aspect of the invention by providing a power module power module, the power module may comprise a power device, a baseplate, a circuit carrier, and a flat stacked aluminium electrolytic snubber capacitor, the stacked aluminium electrolytic snubber capacitor may comprise
  a layered structure, which may comprise
    a cathode layer,
    a separator layer, which may comprise paper and an electrolyte and
    an anode layer, which may comprise an aluminium material with an aluminium oxide dielectric,
wherein the circuit carrier may be mounted on the baseplate, the power device and the snubber capacitor may be placed on the circuit carrier or baseplate within the power module and electrically connected to the circuit carrier preferably by one or more electrically conductive line(s) and pad(s), the circuit carrier may be configured for providing an electrical connection between the power device and the snubber capacitor.

In an embodiment of the invention, the stacked aluminium electrolytic snubber capacitor may be connected to the circuit carrier by the anode or cathode layer being disposed on the circuit carrier and the corresponding cathode or anode layer being electrically connected through a connector to the circuit carrier.

In an embodiment of the invention, a bonding layer may be placed between the stacked aluminium electrolytic snubber capacitor and the baseplate or circuit carrier.

In an embodiment, the stacked aluminium electrolytic snubber capacitor may have a top layer, either the anode or cathode layer, a middle layer, which may be the separator layer, and a bottom layer, which may be the corresponding remaining cathode or anode layer, wherein the top layer may be extended in a direction in the plane defined by the layer, so as to extend beyond the middle and bottom layer, so to be electrically connected to the circuit carrier.

In an further embodiment of the invention, the anode or cathode layer may encapsulate the other layers of the stacked aluminium electrolytic snubber capacitor in a can-like shape, so to electrically connect both the anode and cathode layer to the circuit carrier for wireless bonding.

In an embodiment, the bottom layer may be extended in a direction defined by the plane of the layer, the direction being different from the top layer, so as extend beyond the bonding layer, so it may be electrically connected to the circuit carrier.

In a further embodiment of the invention, the baseplate may further comprise a heatsink or may be connected to an external heatsink.

In an embodiment, the electrolyte may be a polymer solution, such as a PEDOT:PSS polymer mixture.

In an embodiment, if the capacitor is directly placed on the baseplate the anode, the cathode foil or the bonding layer may be electrically insulated towards the baseplate.

In an embodiment, the capacitor may be electrically insulated on all its non-insulated surfaces, preferably by covering the surfaces in a non-conductive material.

In an embodiment, tunnels may be etched into the aluminium material, such that the electrolyte impregnates the tunnels.

In an embodiment, two or more capacitors may be placed in series or parallel, either by stacking the capacitors and/or by arranging them on the circuit carrier.

In an embodiment, if the capacitors are stacked, a thermally conducting, and if placed in series electrically insulating, layer may be placed between the stacked capacitors.

In an embodiment of the invention, the capacitor may be mechanically pressed onto the baseplate or circuit carrier by use of fastener, such as a rivet, clamp, or spring.

In an embodiment, wherein the capacitor may be configured to be soldered, connected by adhesives, or sintered to the circuit carrier.

The invention is particularly, but not exclusively, advantageous for obtaining a simple and cost effective design, sufficient high reliability, small and good coolable snubber capacitor.

By power module is preferable meant an assembly containing several power components and capacitors, which are interconnected to perform a power conversion function.

By power device is preferable meant a switching or rectifier in power electronics.

By circuit carrier is preferable meant a surface wherein the components of the power module are placed and which the capacities of providing the correct circuitry for implementing the circuit design.

By baseplate is preferable meant the surface on which the circuit carrier is positioned upon. The baseplate may be a heatsink or an element in connection with a heatsink.

By snubber capacitor is preferable meant Polymer Aluminium Electrolytic capacitor that is used to absorb voltages transient or similar effects from the power module.

The individual aspects of the present invention may each be combined with any of the other aspects. These and other aspects of the invention will be apparent from the following description with reference to the described embodiments.

BRIEF DESCRIPTION OF THE FIGURES

The power module according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
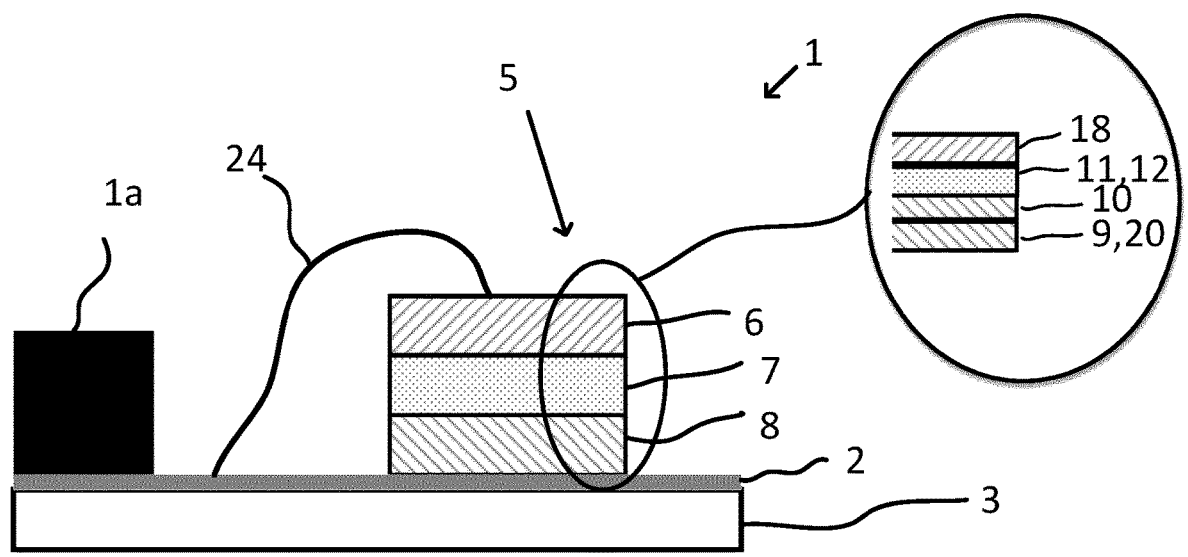
FIG. 1 schematically shows an embodiment of the power module.

Referring to FIG. 1, an exemplary embodiment of the invention is shown. In such an embodiment a power module 1 comprising a power device 1a for current and voltage switching, a baseplate 3, circuit carrier 2 for facilitating an electrical connection between the components of the power module, and a stacked aluminium electrolytic snubber capacitor 5 is shown. The baseplate 3 will, in some embodiments, only possess thermal conductive and mechanical properties. The circuit carrier will in such embodiments, be chosen such that it is electrically insulating towards the baseplate. In other embodiments, the baseplate is electrically insulating, either by an inherent property or by an additional layer between the baseplate and circuit carrier.

In the shown embodiment, a flat stacked aluminium electrolytic snubber capacitor 5 is used to absorb voltages spikes, such as voltage transients, in the power module 1 resulting from the power device 1a. The stacked aluminium electrolytic snubber capacitor 5 comprises
   a layered structure, comprising
      a cathode layer comprising cathode foil 18,
      a separator layer 7, comprising paper 11 and an electrolyte 12 and
      an anode layer 8, comprising an aluminium material 9 and an aluminium oxide dielectric 10.

By scaling the surface area of the capacitor, the capacitance/resistance ratio can be changed according to the application, wherein an larger area will give higher capacitance while the resistance will decrease. The electrolyte type and thickness of the separator layer may also be used as modification parameters that will change the characteristics of the capacitor e.g. the equivalent series resistance (ESR) of the capacitor, which should ideally be as low as possible. The thickness and type of the dielectric will define the capacitance value per area. Thereby, by changing the dimensions and composition of the capacitor's layers the capacitor can be adapted to the specific requirements of the power device, such as to ensure that the capacitor can function in high temperature ranges, which is typically over 100 degree and high voltages range which is typically over 200 V.

In an embodiment, the electrolyte is a polymer solution, such as a PEDOT:PSS polymer mixture.

The stacked aluminium electrolyte snubber capacitor is constructed using a layered sequence with no winding, such that it is constructed as a flat stack, as shown in FIG. 1. An advantage of using the stacked aluminium electrolytic snubber capacitor is the low parasitic inductance and high capacitance pr. area, which leads to lower switching losses in the power module. Furthermore, constructing it as a flat stack enables it to be directly mountable within the power module, enabling better heat transfer to the base of the power module. The capacitor will also have a strong aluminium base, making the construction overall sturdier and more flexible compared to ceramic and film capacitors.

Figure 10:
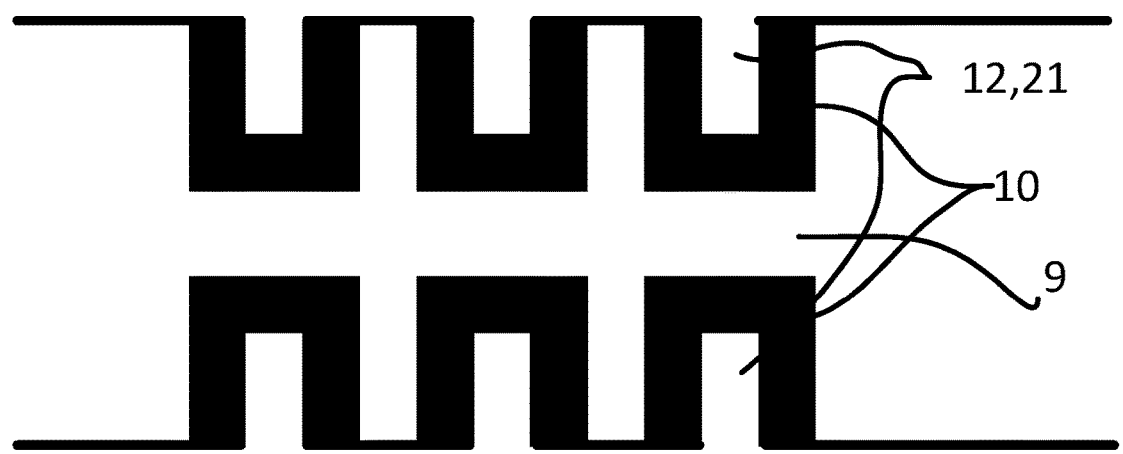
FIG. 10 illustrates highly etched tunnels in the anode foil.

In an embodiment, the dielectric 10 is of the $AL_2O_3$ type. Further, in an embodiment tunnels 21 are etched into the aluminium material 9 in order to enlarge the surface to get as high capacitance per area as possible, and the tunnels are covered by the dielectric 10 such that the electrolyte impregnates the tunnels, see FIG. 10, which is a side view of the structure. This gives the capacitor layer a bigger contact surface area, which increases the capacitance per footprint area.

Referring back to FIG. 1, in the power module 1, a circuit carrier 2 is mounted on the baseplate, such that components of the power module can be placed on the circuit carrier 2 and further electrically connected to the circuit carrier, which will provide the implementation of the circuitry of the power module 1 via the circuit carrier 2.

Figure 2:
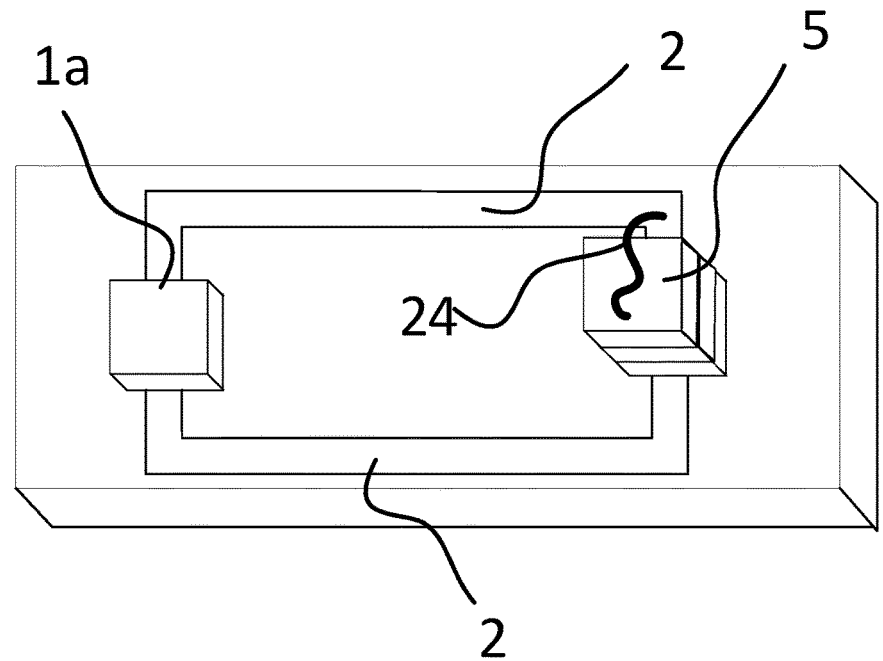
FIG. 2 shows an embodiment of the layout of the circuit carrier.

The circuit carrier 2, as shown in FIG. 2, consists of one or more electrically conductive line(s) and pad(s), such that the components can be electrically connected to each other in the desired configuration by use of the electrical conductive material. In the case of a parallel connection of snubber capacitors, two conductive lines are necessary, a negative line and a positive line.

In most embodiments, the circuit carrier are comprised of current and voltage carrying metallic strips, which is disposed on an electrical insulting substrate placed on the baseplate, such that no charge is carried onto the baseplate. The configuration of the circuit carrier will depend on the desired circuit design and not all conductive lines are shown in FIG. 2.

In the present embodiment, the components of the power module is the power device 1a and the snubber capacitor 5. The circuit carrier will provide a circuit design such that these components are in an electrical connection, as seen in FIG. 2, such that the snubber capacitor 5 is capable of absorbing the voltages spikes of the power device. This could be a parallel connection for an IGBT module or a serial connection for other types of circuit topologies. If multiple capacitor are placed in series, the circuit carrier will provide such an electrical connection between them. The electrical connection will depend on the power module circuit design and application.

As the capacitor is constructed as a flat stack, the entire length of the bottom layer of the capacitor is in direct contact with the circuit carrier or the baseplate. It is therefore preferred that at least one side of the stack is flattened to facilitate good contact with the circuit carrier or the baseplate. This will ensure that heat generated by the snubber capacitor is dissipated to the baseplate or circuit carrier in an effective way.

In some embodiments of the invention, the stacked aluminium electrolytic snubber capacitor 5 is connected to the circuit carrier by the flat anode or cathode layer being disposed on the circuit carrier, providing the connection by physical contact, and the corresponding cathode or anode layer being electrically connected through a connector 24 to the circuit carrier.

In FIG. 1, the cathode layer 6 is shown as the top layer, which is connected to the corresponding circuit carrier 2 by a connector 24. Such a connector 24 could be a wire, which is bonded onto the circuit carrier 2 using wire bonding by ultrasonic welding (comparable to bond wires on semiconductor components), but other connections types are also envisioned, such as top terminal connection, press-pins connection etc. The anode layer will be connected to the positive part of the circuit carrier and the cathode layer to the negative part of the circuit carrier. The lower layer could also be connected to the circuit carrier similarly to the top layer, or placed on the circuit carrier to facilitate the electrical connection.

Figure 3:
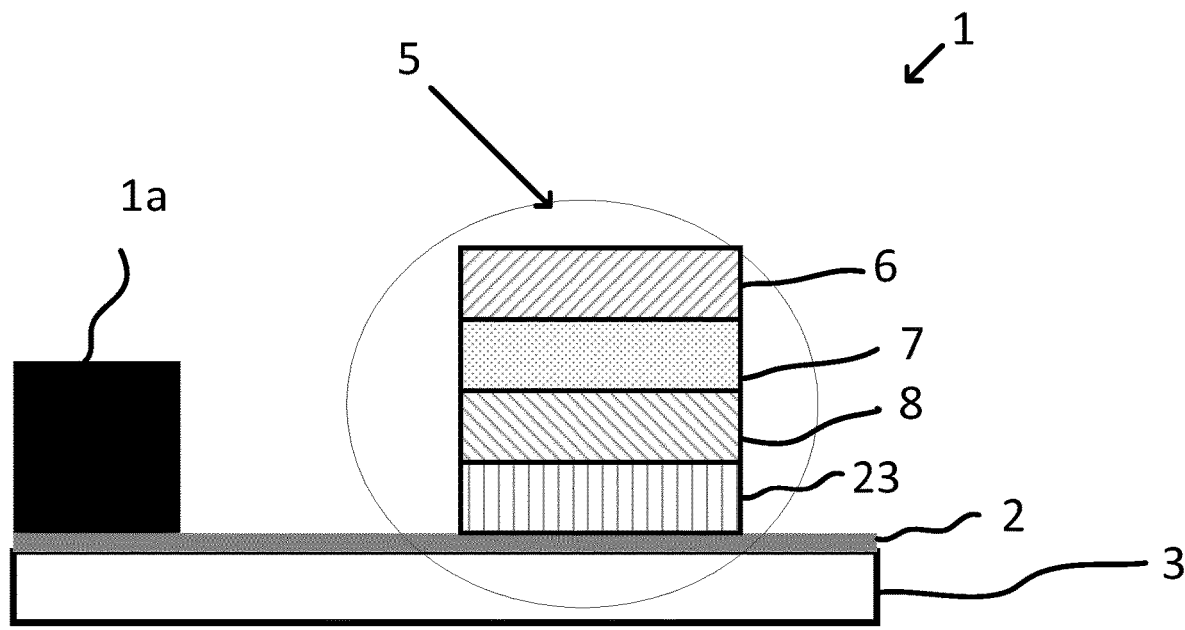
FIG. 3 shows an embodiment of the power module, wherein a bonding layer is included.

In an embodiment, a bonding layer 23 is placed between the stacked aluminium electrolytic snubber capacitor 5 and circuit carrier, as seen in FIG. 3. This bonding layer 23 ensures that the layer, which is connected to the circuit carrier, has good thermal and electrical conductive contact with the circuit carrier. The bonding layer is therefore preferably chosen among Al, Ag, Cu, Sn, Pt, Pd, Ni, Au etc. The bonding preferable occurs by a substance-to-substance bond. This means that at least one side of the capacitor should have a suitable plating for the bonding of the capacitor to the circuit carrier. Without such a bonding layer, the capacitors could have regions without direct contact with the circuit carrier. The bonding will thereby in such an embodiment be advantageous as the anode and cathode foil might contain impurities as well as dielectric, which does not make an ideal electrical contact with the circuit carrier.

The bonding layer 23 could also be an adhesive, which is electrical insulating, but thermal conductive. This could be advantageous if the capacitor is placed on the baseplate or when the capacitor is placed within a metallic housing, which is placed onto the baseplate or circuit carrier or when the electrical connection is done outside the footprint of the snubber capacitor.

Figure 4:
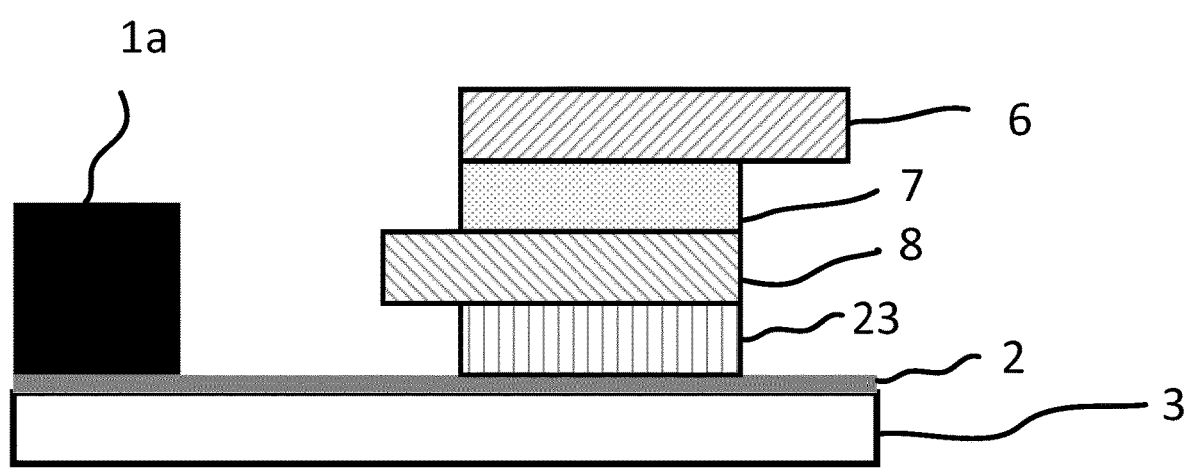
FIG. 4 shows an embodiment of the connection of the capacitor to the circuit carrier.

A way of avoiding wire bonding, in an embodiment, is by using the connection concept shown in FIG. 4. In such an embodiment, the stacked aluminium electrolytic snubber capacitor 5 has a top layer, either the anode or cathode layer, a middle layer, which comprises the electrolyte and paper layer, and a bottom layer, which comprises the corresponding remaining cathode layer or anode layer. By extending the top layer in a direction in a plane defined by the layer, such that the layer is extended beyond the middle and bottom layer, creates a contact point (FIG. 5, 25) for an electrical connection of that top layer to the corresponding circuit carrier pad by a bonding technology which usually cannot be handled on top of the capacitor like welding, since these kind of technologies would bring too high destructive force and/or temperature into the capacitor stack. The general idea of these embodiments is that the bonding area should be outside of the projection of layer 7. This can also be done for the lower layer, as seen in FIG. 4.

Figure 5:
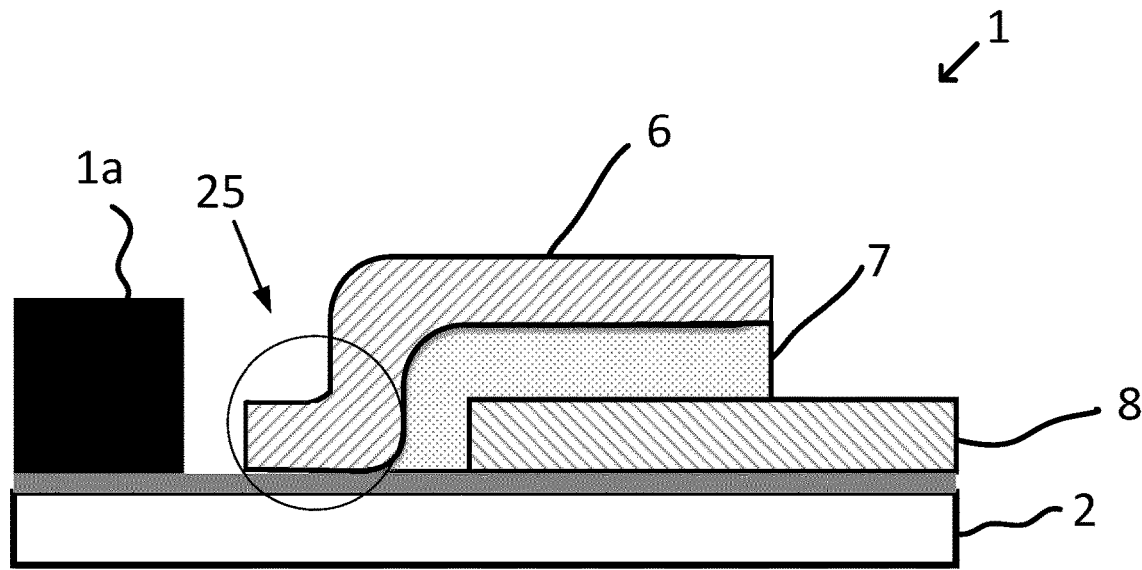
FIG. 5 shows an embodiment of the power module.

A connection scheme, utilizing the concepts and consideration of the embodiment in FIG. 4, is shown in FIG. 5, wherein the cathode side is the top layer. As the cathode and anode layer both comprise an aluminium foil, they are flexible to a certain extent, such that by extending them horizontally a vertical extension is possible, such that they can be connected with the circuit carrier. In FIG. 5 a bonding layer is not present, but the anode extension and cathode extension is advantageous connected using soldering, sintering or other conventional electrical connection type, which could be done through a bonding layer. The connection could also be achieved by a press type connection, such that the electrical contact is achieved by mechanical pressing the anode or cathode foil down to the circuit carrier or a combination thereof.

The connection of FIGS. 4 and 5 is preferred since it is difficult to solder and connect the bottom of the capacitor to the circuit carrier. By extending the anode layer 8 and cathode layer 9 the electrical bonding occur "outside" of the initial footprint of the capacitor, which improves the connection, see FIG. 6 for such an implementation, wherein both the anode and cathode layer is extended and connected in such a manner to the circuit carrier. The separator layer 7 will equally be extended to ensure that it covers the endportions of lower, either anode or cathode layer. The separator layer is conventional also extended such that is it slightly bigger than the anode and cathode layer to completely separate the layers.

Figure 6:
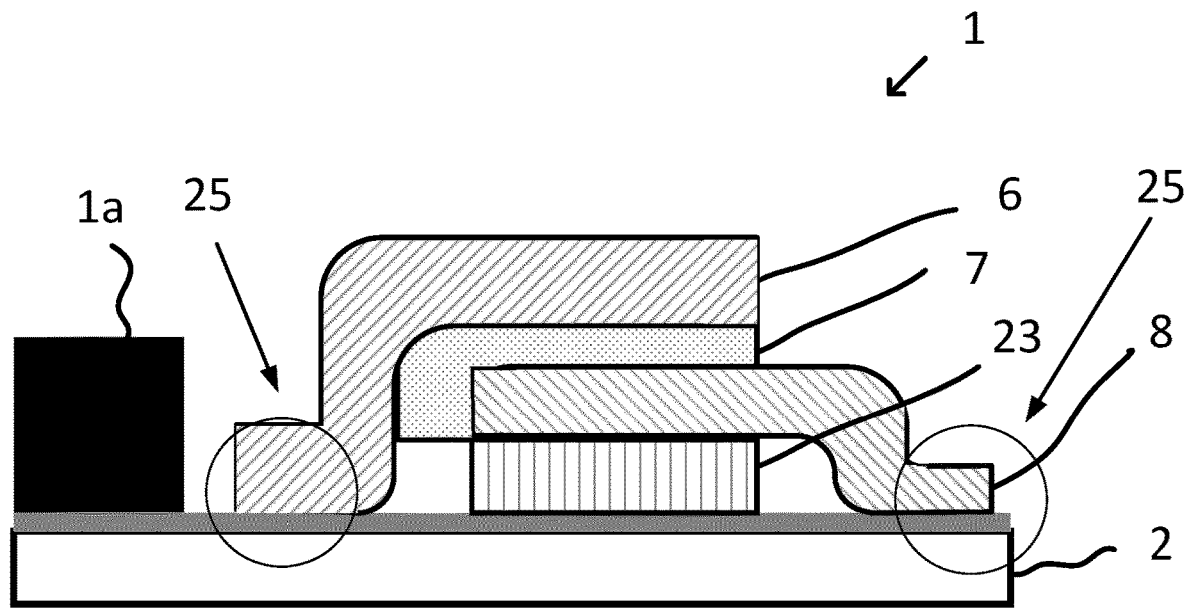
FIG. 6 shows an embodiment of the connection of the capacitor to the circuit carrier in FIG. 4 including a bonding layer for the capacitor.

The bonding layer 23 could also be present, as seen in FIG. 6, such that the bonding layer is, in such an embodiment, preferable an adhesive, which is thermal conductive, to take advantage of the heat transfer properties of the aluminium snubber capacitor, and electrical insulating to ensure that there is only one contact point 25 for the anode and cathode layer to the circuit carrier.

Such a scheme is advantageous to connect the lower layer of the capacitor to the substrate. This is useful in cases wherein the capacitor is placed upon a layer, which is not electrically conductive such as the baseplate. It will normally be the anode and cathode foil of the layer that is extended and connected to the circuit carrier, as seen in FIG. 4. The connection type of FIG. 6 is preferred as it is hard or in cases impossible to ensure a perfect connection of the bottommost layer to the circuit carrier, even with the addition of a bonding layer that is electrical conductive. The bonding layer is preferable therefore only used to established good thermal contact between the capacitor and circuit carrier and the electrical connection are done outside the footprint of the capacitor.

Figure 7:
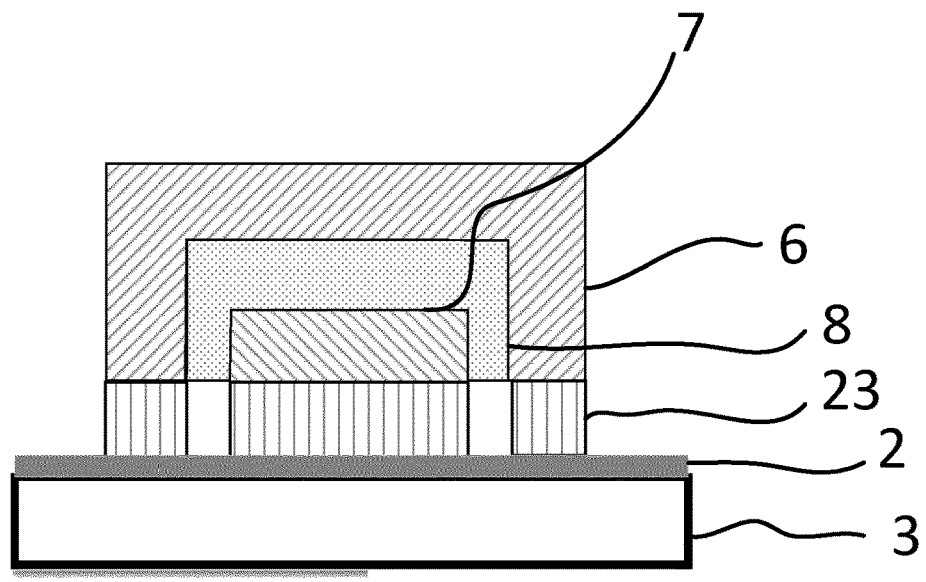
FIG. 7 shows another embodiment of the capacitor.

A third way of bonding the capacitor to the baseplate and circuit carrier can be seen in FIG. 7, wherein either the anode or cathode layer encapsulates the other layers of the stacked aluminium electrolytic snubber capacitor 5 in a can-like shape, so to electrically connect both the anode and cathode layer to the circuit carrier for wireless bonding. A bonding layer could advantageous be used in such an embodiment, as seen in FIG. 7, in order to achieve good thermal and electrical properties.

In constructing the configuration of FIG. 7, one need to remember that the electrolyte solution is preferable solid, such that the electrolyte layer is not limited by an internal housing. A bonding layer 23 is preferable used in order to achieve good thermal and electrical properties. In such a configuration the layer on the baseplate are flat such that it has a large contact area with the circuit carrier or baseplate. Appropriate potting is used for the power module to protect the two poles of the capacitor against the environment and to do an electric field control.

Figure 8:
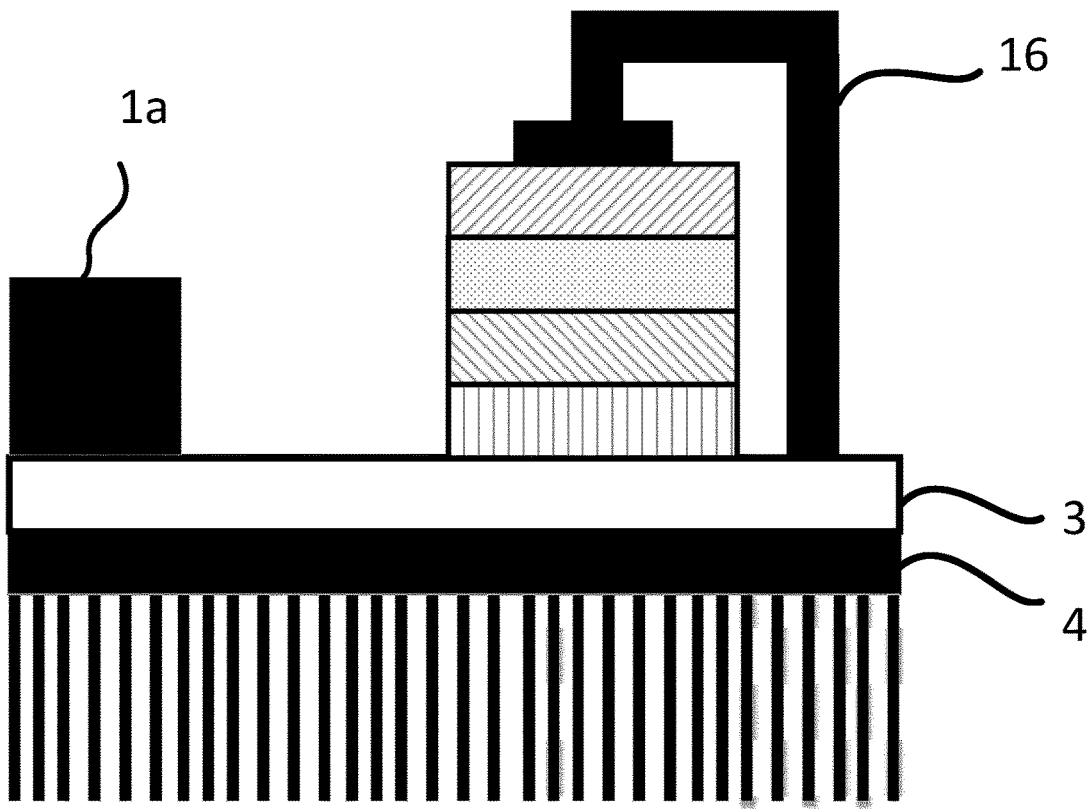
FIG. 8 shows an embodiment including a fastener.

In an embodiment, the baseplate is connected to a heatsink 4, as seen in FIG. 8. In other embodiments, the baseplate is the heatsink. This will allow the capacitor to be cooled through the baseplate and circuit carrier and as all the components, from the aluminium snubber capacitor to the bonding layer, has good thermal properties means that optimal cooling of the capacitor is achieved, due to the large surface area. Snubber capacitors have high cooling demands, as the high voltage spikes and current flow creates heat. The flat design of the capacitors has the advantageous that the capacitor has a large surface area in contact with the circuit carrier, which can dissipate heat through the heat sink.

Figure 9:
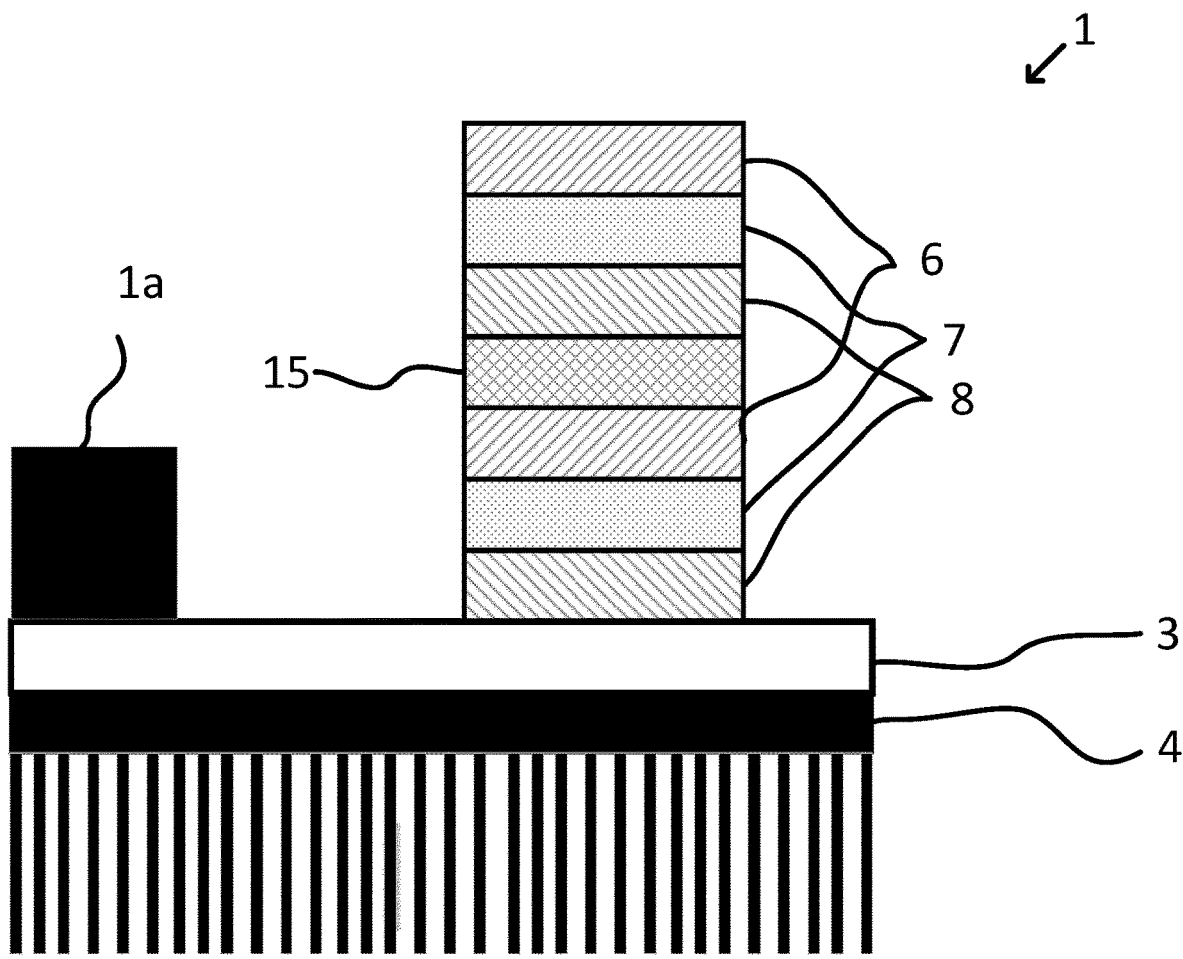
FIG. 9 shows an embodiment of a stacked capacitor connected to a heatsink.

The circuit carries may in some embodiments be integrated as wire bonding between the capacitor and power device, such that the Such a configuration ensures that the thermal properties of the aluminium capacitor is optimally utilized in the power module. In order to tailor the capacitor to the specific power module it is possible to connect two or more of the capacitors in series. This can, in an embodiment, be achieved by stacking the capacitors, as shown in FIG. 9. In such an embodiment, it is preferable to include a thermal conductive and electrically insulating layer 15. Alternatively, the stack may be arranged such that the anode layer of one capacitor is before an anode layer of the other capacitor, such that a parallel connection is inherently established.

Figure 12:
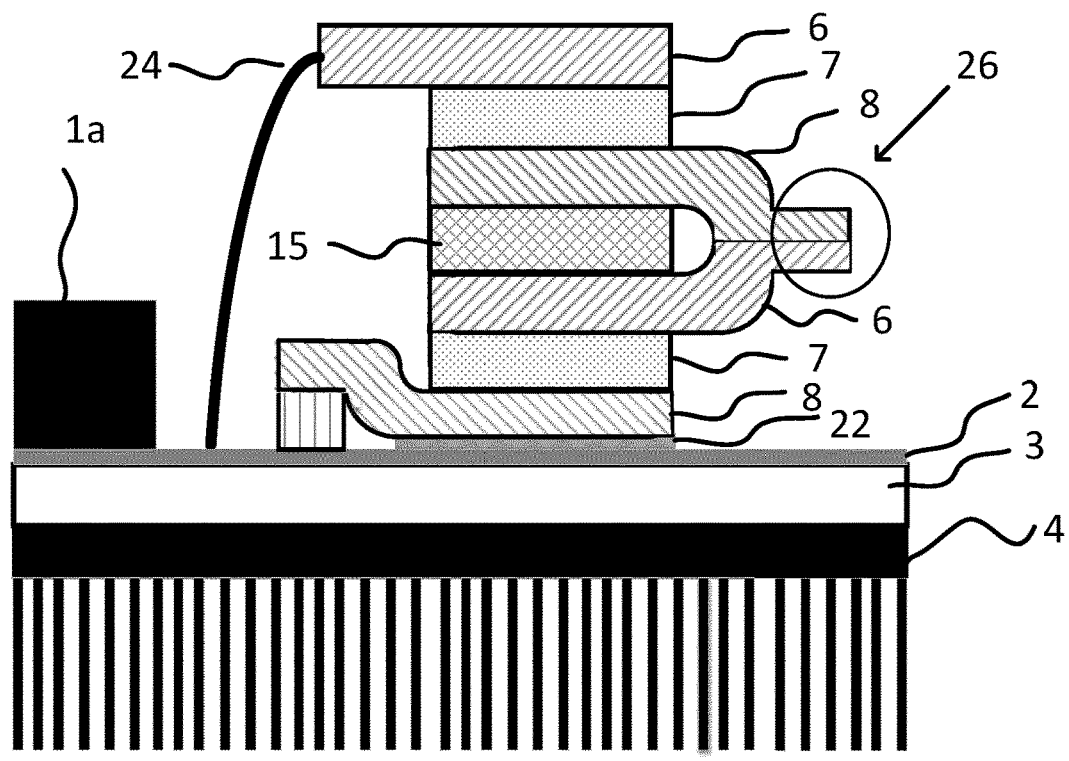
FIG. 12 shows a stacked capacitor connected in series placed and connected to the circuit carrier.

This need to be done in order to ensure that the polarity is the same. A bonding layer could also be placed under the capacitor and connected to the circuit carrier as shown in the previous embodiment. The individual capacitors in the stack can then be connected using the concept of FIG. 4, such that the layer can be joined as seen in FIG. 12. The joining point 26 could be by soldering, sintering, clamping, welding, riveting, ultra-sonic welding or other suitable method. The topmost and bottommost layers could equally be connected by welding, riveting, ultra-sonic welding or other suitable method to the baseplate or circuit carrier.

The bottommost layer is connected by its extension to the circuit carrier and the topmost layer could be connected by a connector to the circuit carrier.

Figure 11:
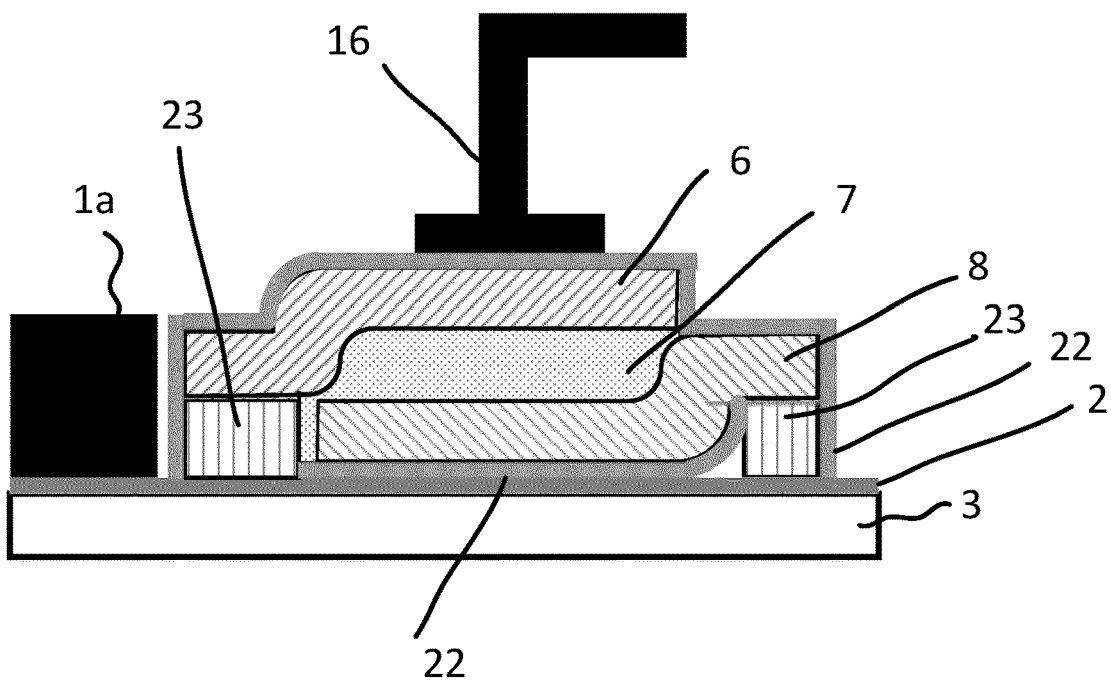
FIG. 11 shows an embodiment of the invention wherein the capacitor is insulated and connected to the circuit carrier.

Electrical insulation 22 is placed under the bottommost layer, such that the electrode is electrically insulated. This is, in an embodiment, also done for the topmost layer, such that the whole capacitor is electrically insulated, as seen in FIG. 11. All other non-insulated parts are preferable insulated in the same manner as the active devices on the circuit carrier. In an embodiment, this layer 22 could be the same as the bonding layer, but could also be different from the bonding, since the bonding layer is in some embodiment and particular in the embodiment of FIG. 12 electrically conductive, i.e. non-insulating.

Alternatively, the capacitors can be placed in series on the baseplate and connected to the circuit carrier individually, such that the circuit carrier will facilitate the serial or parallel connection between the capacitors. The two approaches can also be combined, such that the capacitors can be delivered with different specifications.

In order to achieve good contact between the capacitor and the circuit carrier the capacitor, in an embodiment, is mechanically pressed onto the baseplate by use of a fastener 16, such as a rivet, clamp or spring, as seen in FIG. 8. This ensures that the capacitor is sufficiently cooled during operation and may be electrically connected in that way. This could also be achieved, in an embodiment, by soldering or sintering the capacitor to the circuit carrier. The bonding layer 23 is preferable placed under the bottommost layer, to facilitate the bonding to the circuit carrier.

An advantageous embodiment of a single stacked capacitor is shown in FIG. 11. In this embodiment electrical insulation 22, in the form of an electrical insulation layer, is placed under the bottommost layer and topmost layer to electrically insulate the electrodes, i.e. the anode and cathode foil. This must be done in a way, such that no voltage breakdown can occur. This insulation layer is extended around all non-insulating parts of the capacitor except for the areas, which is used to electrical connect the capacitor to the circuit carrier.

In most embodiments, it is required to electrical insulate the capacitor on the circuit carrier. This could in some embodiments be achieved by a capacitor housing, which is not shown.

This allows the electrodes to be pressed upon the circuit carrier or baseplate. The anode and cathode foil is extended according to the principle of FIG. 4, and this part of the foils are connection using a bonding layer, which is electrically and thermally conductive to provide the connection to the circuit carrier. This connection will be the only electrical connection and all other parts of the capacitor is insulated using conventional principles as used to insulate the active device in the power module.

The capacitor is pressed upon the baseplate or circuit carrier, such that heat can be dissipated from the layer into the baseplate and further out through an external heatsink. In some embodiments, the baseplate is the heatsink and in other embodiments, a separate heatsink is placed under the baseplate. The design in FIG. 11 ensures that the capacitor has good electrical contact to the circuit carrier by the contact point(s) 25 and good thermal contact of the bottommost layer to the circuit carrier. The electrical insulation layer could also be provided as a separate housing around the capacitor. The main idea is that the housing or electrical insulation layer should be thermally conductive to take advantage of the thermal properties of the aluminium snubber device, such that effective cooling is achieved through the circuit carrier and baseplate.

The insulation layer could be part of the anode or cathode foil. The insulation layer will further, in some embodiment, insulate all surface areas of the capacitor that is not electrically insulated, as seen in FIG. 11. This could, however, also be done by a capacitor housing. In some embodiments, the snubber capacitor is compatible with state of the art potting for electrical insulation (such as silicone gel, PU, etc.), corrosion prevention and contamination with dust etc.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

REFERENCE LIST

1. Power module
1a. Power device
2. Circuit carrier
3. Baseplate
4. Heatsink
5. Stacked aluminium electrolytic snubber capacitor
6. Cathode layer
7. Separator layer
8. Anode layer
9. Aluminium material
10. Dielectric
11. Paper
12. Electrolyte
13. Power module
15. Insulation layer
16. Fastener
17. Conductive tracks
18. Cathode foil
19. Paper layer
20. Anode foil
21. Anode foil structure (etched tunnels)
22. Electrical insulation
23. Bonding layer
24. Connector
25. Contact point
26. Joining point

The invention claimed is:

1. A power module comprising a power device, a baseplate, a circuit carrier, and a flat stacked aluminium electrolytic snubber capacitor, the stacked aluminium electrolytic snubber capacitor comprising:
a layered structure, comprising:
a cathode layer,
a separator layer, comprising paper and an electrolyte and
an anode layer, comprising an aluminium material with an aluminium oxide dielectric,
wherein the circuit carrier is mounted on the baseplate, and the power device and the snubber capacitor are placed on the circuit carrier within the power module and electrically connected to the circuit carrier by one or more electrically conductive line(s) and pad(s), such that the circuit carrier is configured to provide an electrical connection between the power device and the snubber capacitor.

2. The power module according to claim 1, wherein the stacked aluminium electrolytic snubber capacitor is connected to the circuit carrier by the anode or cathode layer being disposed on the circuit carrier and the corresponding cathode or anode layer being electrically connected through a connector to the circuit carrier.

3. The power module according to claim 1, wherein a bonding layer is placed between the stacked aluminium electrolytic snubber capacitor and the baseplate or circuit carrier.

4. The power module according to claim 1, wherein the stacked aluminium electrolytic snubber capacitor has a top layer, either the anode or cathode layer, a middle layer, which is the separator layer, and a bottom layer, the corresponding remaining cathode or anode layer, wherein the top layer is extended in a direction in the plane defined by the layer, so as to extend beyond the middle and bottom layer, so to be electrically connected to the circuit carrier.

5. The power module according to claim 1, wherein either the anode or cathode layer encapsulate the other layers of the stacked aluminium electrolytic snubber capacitor in a can-like shape, so to electrically connect both the anode and cathode layer to the circuit carrier for wireless bonding.

6. The power module according to claim 4, wherein the bottom layer is extended in a direction defined by the plane of the layer, the direction being different from the top layer, so as extend beyond the bonding layer, so to be electrically connected to the circuit carrier.

7. The power module according to claim 1, wherein the baseplate further comprises a heatsink or is connected to an external heatsink.

8. The power module according to claim 1, wherein the electrolyte comprises a polymer solution.

9. The power module according to claim 3, when if the capacitor is directly placed on the baseplate, the anode, the cathode foil or the bonding layer is electrically insulated towards the baseplate.

10. The power module according to claim 1, wherein the capacitor is electrically insulated on all of its non-insulated surfaces by covering the surfaces in a non-conductive material.

11. The power module according to claim 1, wherein tunnels are etched into the aluminium material, such that the electrolyte impregnates the tunnels.

12. The power module according to claim 1, wherein two or more capacitors are placed in series or parallel, either by stacking the capacitors and/or by arranging them on the circuit carrier.

13. The power module according to claim 12, wherein, if the capacitors are stacked, a thermally conducting, and if placed in series electrically insulating, layer is placed between the stacked capacitors.

14. The power module according to claim 1, wherein the capacitor is mechanically pressed onto the baseplate or circuit carrier by use of fastener.

15. The power module according to claim 1, wherein the capacitor is configured to be soldered, connected by adhesives, or sintered to the circuit carrier.

\* \* \* \* \*